United States Patent [19]

Staar

[11] 3,807,673
[45] Apr. 30, 1974

[54] ADAPTER STAND FOR A PORTABLE ELECTRICAL DEVICE

[76] Inventor: Marcel Jules Helene Staar, 479 Avenue Louise, Brussels, Belgium

[22] Filed: Apr. 25, 1972

[21] Appl. No.: 247,274

[30] Foreign Application Priority Data
Apr. 26, 1971  Belgium .............................. 766280

[52] U.S. Cl. ............................ 248/25, 317/101 DH
[51] Int. Cl. ....................... F16m 5/00, F16b 39/00
[58] Field of Search ........... 248/25, 19, 23, 13, 346; 340/174.1 R; 312/DIG. 26, 7 R; 274/11 R; 317/101 CB, 101 DH; 179/147, 153

[56] References Cited
UNITED STATES PATENTS

| | | | |
|---|---|---|---|
| 2,077,160 | 4/1937 | Wilson ........................ | 317/101 C X |
| 3,488,867 | 1/1970 | Lyon et al. ...................... | 274/4 J X |
| 2,519,292 | 8/1950 | Schaefer ......................... | 312/7 R X |
| 2,900,191 | 8/1959 | Roberts .............................. | 274/4 J |
| 3,293,528 | 12/1966 | Rosen et al. ..................... | 248/346 X |

*Primary Examiner*—J. Franklin Foss
*Attorney, Agent, or Firm*—Waters, Roditi, Schwartz & Nissen

[57] ABSTRACT

An adapter stand for a portable dictating machine having a control slider slidable between a numbe of control positions includes keys mounted on the stand. A slidable operating plate is mounted on the stand for displacement in response to actuation of the keys, each key being coupled to the plate by a respective lever serving to displace the plate on actuation of the corresponding key. The slidable plate has an aperture in which the slider of the portable machine is entrained when the machine is received on the stand, so that displacement of the plate by a key on the stand moves the slider to a respective control position.

4 Claims, 4 Drawing Figures

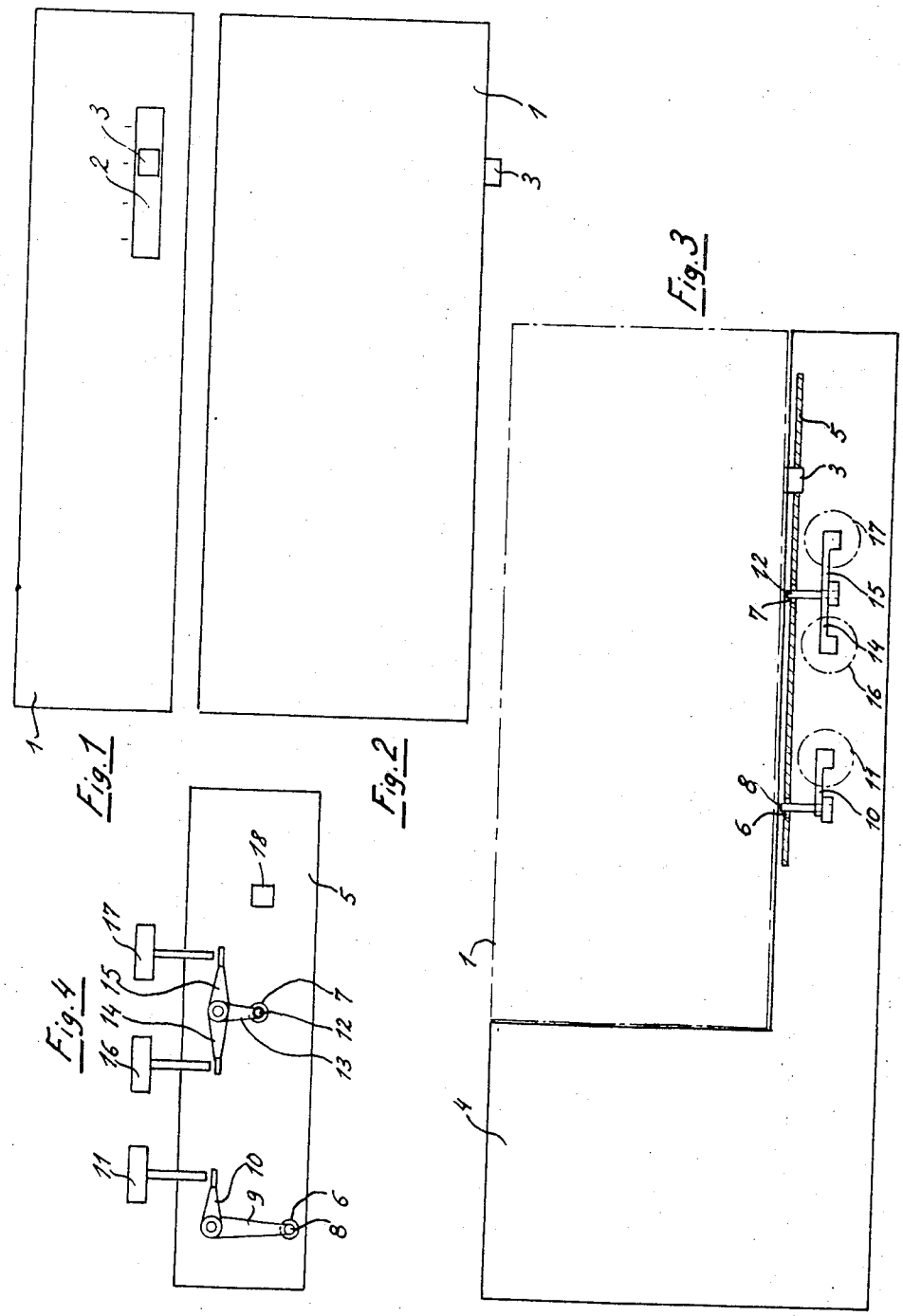

ADAPTER STAND FOR A PORTABLE ELECTRICAL DEVICE

BACKGROUND OF THE INVENTION

Adapter stands are known for supplying electric power from a mains supply to portable electrical devices which normally operate on batteries, thus avoiding use of the battery in places where a mains supply is available.

In such cases, the portable device is constructed so that when it is placed on the adapter stand, its batteries and microphone are disconnected and it is connected by the electric power system to an equivalent supply, the loud speaker being replaced e.g. by headphones.

The aim of the invention is to couple a portable device to a supply stand in such a manner that the controls of the portable device, which often have to be manipulated in various ways, are positioned in more appropriate places and are better adapted to the different operations.

The above situation applies to portable dictating machines wherein the physical operations for manipulating the controls are not the same in a portable device used mainly for dictation and held in the hand, as they are for a stationary assembly connected to the mains and chiefly used by a secretary for reproducing recordings.

For ease and reliability of operation, the controls should be adapted to the appropriate hand and finger movements depending on the use of the machine.

SUMMARY OF THE INVENTION

The invention provides for a portable electrical device, such as a dictating machine, having first manual control means, an adapted stand including a body presenting a surface for receiving the portable device, second manual control means mounted on said stand body and operable by manipulations having different characteristics from the manipulations required to operate the first manual control means, and coupling means coupling the first and second manual control means for transmitting a movement of the second control means into a corresponding movement of the first control means.

BRIEF DESCRIPTION OF DRAWING

In order that the invention may be readily understood, an embodiment thereof will now be described in more detail, by way of example, with reference to the appended drawing, in which:

FIG. 1 is a side elevational view of a portable dictating machine;

FIG. 2 is a plan view of the machine of FIG. 1;

FIG. 3 is a side view, partly in section, of a stand embodying the invention for use with the machine of FIGS. 1 and 2; and FIG. 4 is a plan view of the stand of FIG. 3.

DESCRIPTION OF PREFERRED EMBODIMENT

In the drawings, FIGS. 1 and 2 show a portable electrical device in the form of a dictating machine as described and disclosed in applicant's Belgian Pat. application No. 102,601 filed on Apr. 23, 1971. The casing 1 of the dictating machine is provided with a controller or multiple switch comprising an elongated window 2 along which a control slider 3 is movable between four switch positions. In the drawings, the slider 3 is shown in an initial off position to the right of the centre of the slot 2 as seen in FIG. 1.

FIG. 3 shows an adapter stand 4 for receiving the dictating machine of FIGS. 1 and 2 and energizing such machine from a mains supply. To enable the slider 3 of the dictating machine to be operated by more conveniently disposed controls on the stand 4, the stand includes a slidable operating plate 5 provided with holders 6 and 7.

A pin 8 which is rotatably received in holder 6 is formed on a lever 9 having an arm 10 positioned to co-operate with a push button or key 11 mounted on the body of the stand 5. A pin 12 which is rotatably received in holder 7 forms part of a lever 13 having two oppositely extending arms 14 and 15 positioned to co-operate with respective push-buttons 16 and 17. Slidably plate 5 has an aperture 18 in to which the slider 3o of the dictating machine projects when the machine is appropriately positioned on the stand 4 as shown in FIG. 3.

FIGS. 3 and 4 show the position of the push buttons 11, 16 and 17 and the associated levers 9 and 13 when the slider 3 of the dictating machine is in the initial off position shown in FIG. 1. Operation of the appropriate push button 11, 16 or 17 pivots the associated lever thereby displacing plate 5 which entrains slider 3 and carries it to a corresponding switch position. Thus operation of push button 16 moves the slider 3 to its extreme right hand switch position as seen in FIG. 1, operation of button 17 moves the slider 3 to the switch position just to the left of the centre of the window 2, and operation of button 11 moves the slider 3 to its extreme left hand switch position.

I claim:

1. An adapter stand for a portable electrical device, such as a dictating machine, having first manual control means, comprising, a body having a surface for receiving said portable device, second manual control means mounted on said stand body and operable by manipulations having different characteristics from the manipulations required to operate said first manual control means, and coupling means coupling the first and second manual control means for transmitting a movement of said second control means into a corresponding movement of said first control means, said first manual control means including a control element slidable between a number of control positions, said second manual control having keys, said coupling means being responsive to actuation of a key of said second manual control means to displace said control element of said first manual control means to a respective control position, said coupling means comprising a slidable plate mounted on said stand for displacement in response to actuation of said keys of said second manual control means, said slidable plate including means for entraining said control element of said first manual control means of a portable device received on said stand.

2. A stand according to claim 1, wherein each of said keys of said second manual control means co-operates with a respective lever operable to displace said slidable plate in response to actuation of the corresponding key.

3. An adapter stand for a portable electrical device, such as a dictating machine, having first manual control means, comprising, a body having a surface for receiving said portable device, second manual control means mounted on said stand body and operable by manipulations having different characteristics from the manipulations required to operate said first manual control means, and coupling means coupling the first and second manual control means for transmitting a movement of said second control means into a corresponding movement of said first control means, said coupling means comprising a movable member mounted on said stand for displacement in response to actuation of said second manual control means, said movable member including means for entraining said first manual control means of a portable device received on said stand.

4. A stand as claimed in claim 3, said first manual control means including a control element slidable between a number of control positions, said second manual control having keys, said coupling means being responsive to actuation of a key of said second manual control means to displace said control element of said first manual control 1 means to a respective control position.

* * * * *